Patented May 8, 1934

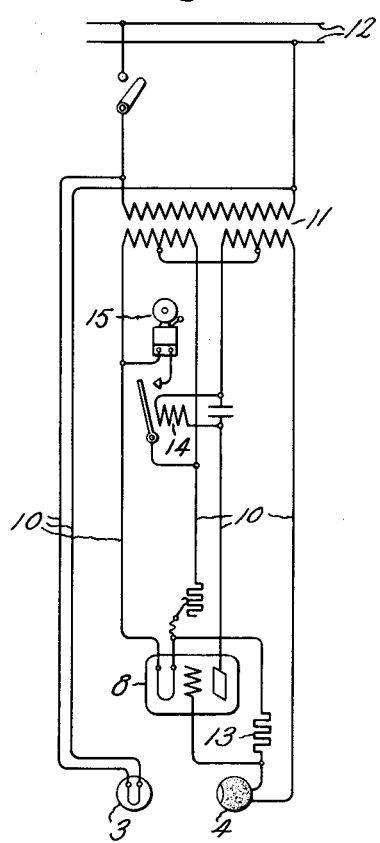
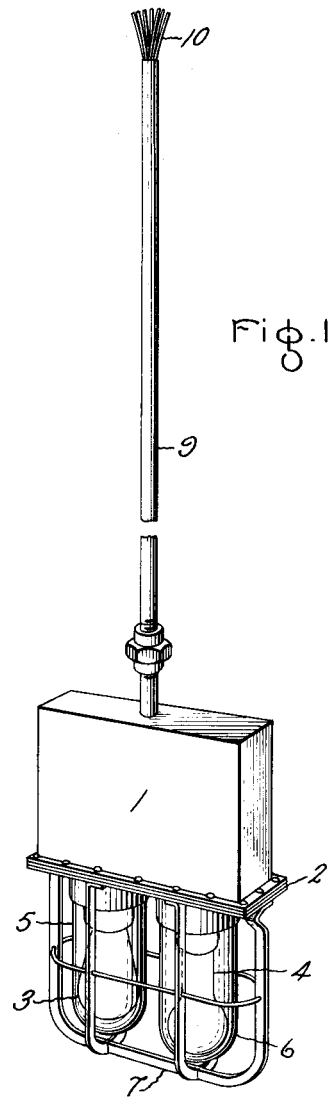

1,958,252

UNITED STATES PATENT OFFICE 1,958,252

SLUDGE LEVEL INDICATOR

Harold C. Singleton and Earl R. Meissner, Schenectady, N. Y., assignors to General Electric Company, a corporation of New York Application December 27, 1926, Serial No. 157,217

6 Claims. (Cl. 177—311)

Our present invention relates to indicators, and more particularly to a unit comprising an electron discharge device and a light sensitive cell, which is adapted to be employed as a sludge level indicator.

In sewage disposal plants, the sludge, after treatment, is pumped into settling tanks to separate the sludge from the liquid material. After settling, the clear liquid is allowed to flow off, and when a certain amount of sludge has collected, the tanks are cleaned. In order to know that the sludge has risen to a predetermined level, it is desirable to employ means which will operate automatically when the sludge reaches this level and give either a visible or audible signal.

In carrying our invention into effect, an indicating unit is provided which comprises a casing within which an electron discharge device is mounted. A light sensitive cell, such as a photoelectric cell, and an electric lamp are placed in separate heavy glass bells and secured on the outside of the casing, the cell and lamp being spaced a short distance apart. The casing and attached cell and lamp are then immersed to any desired depth in a settling tank. The intensity of light acting upon the cell and, therefore, the current which flows through the cell, depends upon the translucency of the medium between the lamp and cell. Since the solid matter in the sludge is opaque, the light to the cell is gradually cut off as the sludge rises to a level above the lamp and cell. When the light to the cell is completely cut off, an alarm is sounded.

The novel features which are characteristic of the present invention are set forth with particularity in the appended claims. The invention itself, however, will best be understood from reference to the following specification taken in connection with the accompanying drawing, in which Fig. 1 is a perspective view of a unit embodying the features of our invention, while Fig. 2 shows diagrammatically a circuit arrangement which may be employed with the apparatus shown in Fig. 1.

Referring to the drawing, we have indicated at 1 a sealed metal casing having a flat metal cover 2 provided with sockets in which an electric lamp 3 and a light sensitive cell 4 are detachably mounted. Glass jars or bells 5 and 6 surround lamp 3 and cell 4 respectively, and are detachably secured to the cover member 2 in any suitable manner. A metallic cage 7 is bolted or otherwise secured to the casing 1, and is adapted to enclose and protect the lamp and light sensitive cell. An electron discharge amplifying device 8 mounted in casing 1 is electrically connected to the photoelectric cell. The upper portion of the casing 1 is provided with an elongated iron pipe 9 which may be employed to adjust the casing 1, lamp 3 and cell 4 to varying depths in a settling tank. Leads 10 extend through pipe 9 and are connected to the electrical devices associated with the casing 1.

The operation of the apparatus shown in Fig. 1 will be clear from an examination of the wiring diagram shown in Fig. 2. Current is supplied to the lamp 3 and to the primary of a transformer 11 from alternating current mains 12. The discharge device 8 and cell 4 are connected to the secondary windings of the transformer in such a manner that when light of a given intensity falls on cell 4, a current flows through the cell and resistance 13, producing a negative potential on the grid or control element of the discharge device and preventing the flow of current in the output circuit of the discharge device. When the sludge rises in the settling tank, the light reaching cell 4 is either completely cut off or so diminished in intensity that the negative potential of the grid is no longer sustained by the light sensitive cell, and as a result current flows in the output circuit of the discharge device and energizes relay 14. Energization of relay 14 closes a local circuit for an indicating device 15, which in the present instance is a bell located in a remote control room.

The indicating unit comprising casing 1, electron discharge device 8, lamp 3, and light sensitive cell 4 provides a compact and rugged arrangement of parts. The unit is convenient to handle, and is so constructed that all parts of the unit may be readily replaced in the event of breakage. Although alternating current is employed in the operation of the present arrangement, obviously direct current circuits may be employed if desired.

What we claim as new and desire to secure by Letters Patent of the United States is:

1. A sludge level indicating unit comprising a casing, a lamp and light sensitive cell mounted on the outside of the casing and in proximity to one another, an electron discharge amplifying device mounted in the casing and electrically connected to said cell, and means whereby the lamp and cell may be immersed to varying depths in a container.

2. An indicating unit comprising a casing, a lamp and light sensitive cell mounted on the outside of the casing, and in proximity to one another, an electron discharge amplifying device mounted in the casing and electrically connected to the cell, an elongated hollow member connected to the casing, and electrical connections for said unit extending through said member.

3. A sludge level indicating arrangement in unitary form comprising means for producing an alarm when the density of the sludge changes, said means including in combination, a metallic casing, adapted to be lowered into the sludge, an electron discharge device mounted in the casing, a light-sensitive cell and an electrical lamp both mounted on the outside of the casing to constitute a compact unit, said lamp being adapted to activate the light-sensitive cell when the density of the sludge is less than a predetermined amount, an alarm device associated with the system, electrical connections between the electron discharge device and the alarm device, also between the electron discharge device and the light-sensitive cell whereby the alarm device is adapted to be operated in response to photo-currents derived from the light-sensitive cell.

4. A sludge level indicating unit comprising a lamp and a light-sensitive cell, means supporting said lamp and cell in proximate spaced relation whereby light from said lamp will illuminate said cell, and means connected to said cell responsive to the illumination thereof.

5. A liquid level indicator comprising a portion adapted to be immersed in a fluid, said portion including a source of light, and means responsive to light transmitted from said source through the liquid and indicating means controlled by said light-responsive means.

6. In combination, a container for liquid, a light-responsive element and a source of light spaced apart and submerged in the liquid in said container, and means responsive to said element to indicate the level of said liquid and operated by the light passing from said source through the intervening liquid to said element.

HAROLD C. SINGLETON.
EARL R. MEISSNER.